United States Patent [19]

Carussi

[11] Patent Number: 4,670,925
[45] Date of Patent: Jun. 9, 1987

[54] PROCESS FOR THE PRODUCTION OF A CUSHION FOR A SEAT OR THE BACK FOR A MOTOR VEHICLE OR THE LIKE COMPRISING TWO LAYERS OF FOAMED MATERIAL WITH DIFFERENT PROPERTIES AND CUSHION PREPARED BY THE PROCESS

[75] Inventor: Paolo Carussi, Carre', Italy

[73] Assignee: Clerprem s.r.l., Vicenza, Italy

[21] Appl. No.: 752,364

[22] Filed: Jul. 5, 1985

[51] Int. Cl.⁴ .................. A47C 7/18; B29C 67/22; B29C 39/12

[52] U.S. Cl. .................................... 5/481; 5/464; 264/45.1; 264/46.4; 297/DIG. 1

[58] Field of Search ............ 264/46.4, 45.1; 5/481, 5/448, 464; 297/DIG. 1

[56] References Cited

U.S. PATENT DOCUMENTS

| | | | |
|---|---|---|---|
| 3,257,149 | 6/1966 | Fruchte et al. | 264/46.4 X |
| 3,264,382 | 8/1966 | Angell et al. | 264/46.4 |
| 3,516,901 | 6/1970 | Fultz et al. | 264/46.4 X |
| 3,954,926 | 5/1976 | Pahl | 264/46.4 |
| 4,073,839 | 2/1978 | Burkholder et al. | 264/45.1 |
| 4,246,213 | 1/1981 | Takamatsu et al. | 264/46.4 X |
| 4,379,856 | 4/1983 | Samaritter et al. | 264/45.1 X |
| 4,405,681 | 9/1983 | McEvoy | 264/46.4 X |

Primary Examiner—Philip Anderson
Attorney, Agent, or Firm—Bucknam and Archer

[57] ABSTRACT

A cushion for the seating part or the back rest of the seat of a motor vehicle or the like is prepared with very comfortable seating and good resistance to compression without any spring but similar in properties to cushions which include some metallic structures such as springs. The process consists of introducing within a die, a base foam material (1) from a precut block and lateral parts (2). An external layer (4) of foamed material is formed. The external layer is separated from layers (1) and (2) by means of a sheet of non-woven material (3). The non-woven material permits a controlled compenetration of layer (4) within the layers (1) and (2).

3 Claims, 6 Drawing Figures

PROCESS FOR THE PRODUCTION OF A CUSHION FOR A SEAT OR THE BACK FOR A MOTOR VEHICLE OR THE LIKE COMPRISING TWO LAYERS OF FOAMED MATERIAL WITH DIFFERENT PROPERTIES AND CUSHION PREPARED BY THE PROCESS

The present invention relates to stuffing for the seating part and backrest of seats and the like for motor vehicles and more specifically, to a method for the seating and backrest of producing the stuffing for seats and the like of motor vehicles and similar applications.

More specifically, the present invention relates to a method of producing an article in which the stuffing material has a different resistance to compression for the purpose of achieving lateral support and also a pleasant and comfortable cushion without requiring any metallic structure or support springs which have been conventionally used.

It is well known that stuffing for seats, backs made of polyurethane foam molded either hot or in the cold or cut from a block is subjected to the requirements of obtaining a satisfactory value of the mechanical property of resistance to compression due to a load more or less distributed thereon. In order to satisfy this requirement, at present, there are utilized particular metallic structures which, with or without springs, may also be incorporated into the foam. These metallic structures limit the possibility of achieving the desired objects as to the simultaneous achievement of a good resistance to compression and a satisfactory touch on the surface.

The process of the present invention is intended to provide stuffing which does not require any supporting structure comprising springs nor does it require any metallic insert in order to achieve the lateral support of the stuffing itself.

It is well known that during the step of cold molding the introduction into the die of a material having low density and having open or partially open cellular structure, creates problems due to the fact that this material absorbs the foam thus facilitating the formation of superficial cavities and external films which are not uniform and in general material which must be discarded.

The present invention permits to avoid the drawbacks mentioned hereinabove. The present invention consists of the following:

A—Preparing an external part which represents the shape of the stuffing according to the particular project involved. The volume of this part is determined by the type of comfort which one wishes to achieve. This stuffing is prepared from a specific foam of a urethane prepared in the cold, the specific foam having properties of softness and elasticity with a resistance to compression between 10 and 50 Kg per standard surface unit (according to the standard Uni N. 6353) with density in free expansion between 20 and 60 Kgs per cubic meter.

B—Preparing an internal part the volume of which may vary as a function of the resistance to compression and is formed from an expanded and flexible foam from a polyurethane, a polyether, polyvinylchloride, or polyethylene with a cellular structure more or less open but with properties different from the foam of the type used for the external part and with such a density that the desired properties according to a particular project are guaranteed.

According to one example, one may utilize expanded polyurethane from a block prepared by action of normal polyols with branched polyols, the latter in proportion not exceeding 40%. This external piece is not necessarily shaped. C—Preparing an intermediate layer of separation between the exterior and the interior part made of non-woven material formed from a polyester or polyamide or another composition provided it is obtained as a flat sheet treated on one surface with a film of polyurethane or acrylic resin in an amount not lower than 10 grams per square meter applied in a permanent manner by means of a cylinder or by means of a doctor blade and polymerized at a temperature not lower than 80° C.

This film serves the purpose of retaining exactly the permeability of the surface of the sheet of non-woven material (TNT) or fibers in such a manner as to permit the penetration of the polyurethane in the cold of the external part into the surface layer of the central part during the phase of treatment in the die. The insertion of this sheet treated as described hereinabove, between the external and the internal parts, serves the purpose of binding the two parts between themselves and also permits to achieve a stuffing with increased reaction surface with respect to the reaction surface of the deformation load.

In order to achieve the objects according to the present invention, in addition it is necessary to prepare a die which while maintaining the characteristics of the dies actually used for conventional molding of polyurethane, also exhibits some particular properties as it will be illustrain the attached drawings wherein.

Figure 2:
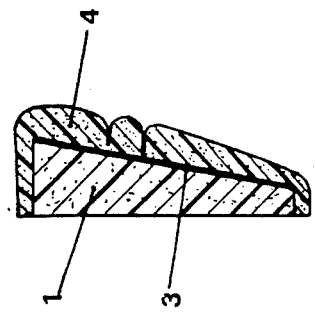
FIG. 2 illustrates a cross section along line II—II of FIG. 3 of the cushion within the die used for the foaming step.

As shown in FIGS. 1 to 4, the cushion according to the present invention, comprises a central layer of base material (1) of the type obtained by cutting a block of expanded material of a predetermined resistance to compression, lateral parts (2) which also are obtained from a block or by molding with essentially similar properties, a separation layer (3) made of a non-woven material of the type described hereinabove and an external layer (4) of expanded foam which has the properties previously mentioned. It should be noted that the layer of non-woven material (3) on one hand separates fully the portions (1) and (4) but separates only partially, parts (2), which on the sides, may compenetrate without being totally separated from the layer of non-woven material.

Figure 1:
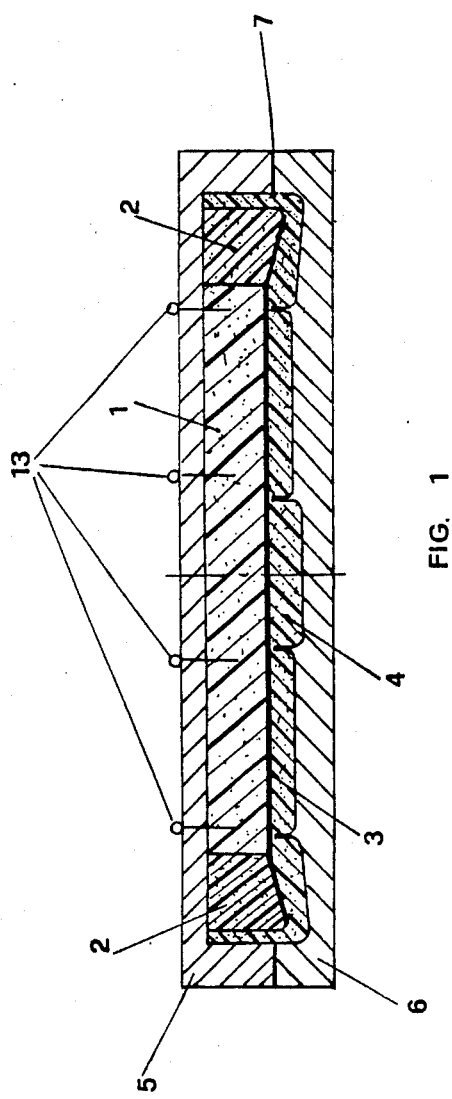
FIG. 1 is a side view in cross section according to the line I—I in FIG. 3.
Figure 3:
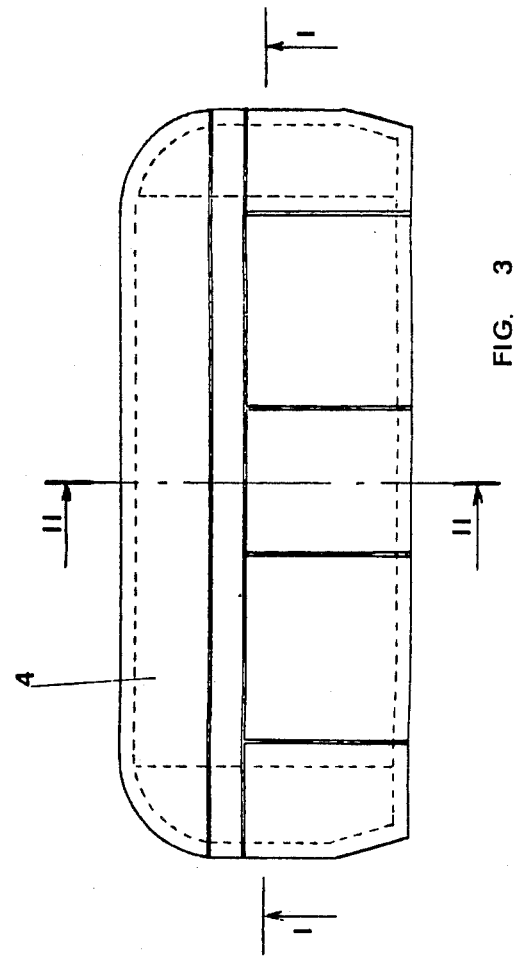
FIG. 3 is a top view of a seat prepared according to the present invention.
Figure 4:
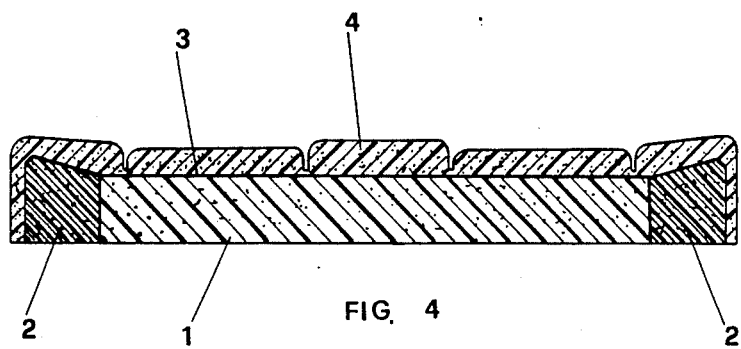
FIG. 4 is a cross section of the finished cushion prepared according to the present invention.

The die to manufacture the cushion according to the present invention, is represented in section in FIG. 1 which shows a movable portion (5) and a fixed portion (6) separated by the separation surface (7) which guarantees a perfect stability of the apparatus when the die is assembled. Pins (13) support part (1) to the die during the phase when part (2) is foamed.

Obviously the particular arrangement of the nonwoven material (3) is such as to achieve the desired objects, that is, the firm connection between parts (1), (2) and (4) with the minimum absorption of the foam for the purpose of avoiding any alteration of the desired project and must be evaluated each time according to the volume ratio between the external part (4) and the internal parts (1) and (2).

In the particular example illustrated in the drawings there are one or more lateral parts (2), the volume of which is determined according to the type of desired rigidity of the project and also according to the design of the cushion itself. These side elements (2) may also be obtained simultaneously with the foaming step in the die when the material (4) is being foamed by superimposing another foam having properties different from the properties used for the external layer (4), such as to guarantee a difference in the resistance to compression with respect to parts (1) and (4).

It is interesting to determine a formulation of material being foamed in the cold studied particularly for the purpose of achieving a controlled expansion so as to avoid excessive pressure in the interior of the die and a viscosity of the foam at the end of the expansion of 10,000–20,000 cps in order to avoid excessive penetration of the non-woven layer. This object is achieved by means of polyols having a molecular weight of 6,000, with primary hydroxyl groups in an amount greater than 80% and polymeric polyols in the amount of 20 to 40%. The catalysis is carried out with a mixture of tertiary amines in suitable proportions so as to guarantee this profile in the increase in viscosity after ¾ expansion.

In several variations in the process according to the present invention, one foresees that in the hollow portions of the die, after introduction of the parts obtained from a block, there are introduced by injection, two or more parts of foam with different characteristics for the purpose of improving finally the comfort of the seating part.

Figure 5:
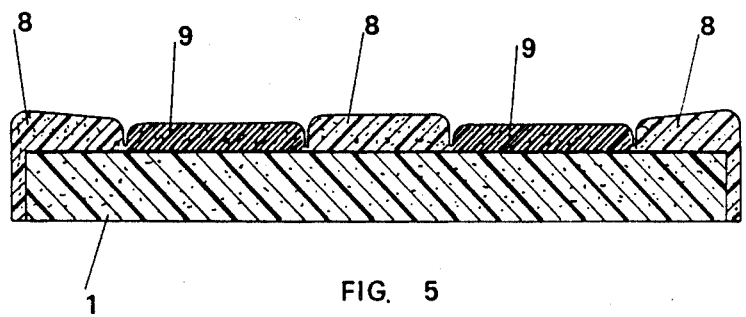
FIG. 5 illustrates in cross section another embodiment of the cushion prepared according to the present invention.

By way of example, in the manufacture of the seat according to FIG. 5, it is possible to provide on the base block (1), two portions obtained by foaming two parts of different elasticity properties designated by numerals (8) and (9) respectively, for instance, more rigid in (8) and softer in (9).

Figure 6:
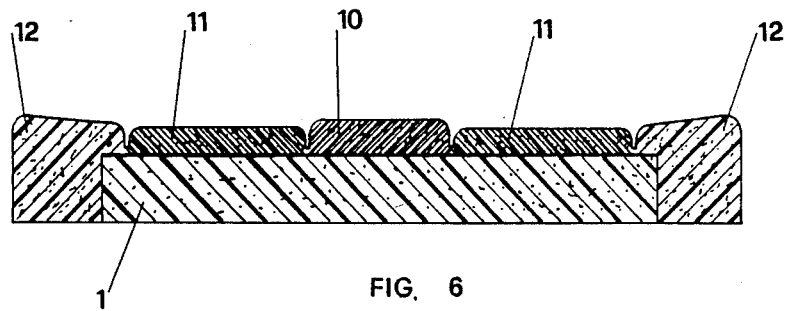
FIG. 6 illustrates in cross section still another embodiment of the cushion according to the present invention.

In the embodiment illustrated in FIG. 6, section (10), which is the central zone of the seat, exhibits a resistance to compression different from the intermediate portions (11) and different from the lateral portions (12), for instance, softer in (11), more rigid in (12) and at the same time, the intermediate portions (11) are softer with respect to the central portion (10) as well as with respect to the lateral portions (12).

Obviously, the construction details and formal requirements of the cushions illustrated in the drawings, merely indicate three particular embodiments in the invention which have been described herein merely by way of illustration and are not intended to limit the invention.

What is claimed is:

1. A process for the manufacture of a cushion for the seating part or the backrest of the seat of a motor vehicle or the like which consists of introducing within one part of a two-part die, said die having at least one hollow portion, a preformed piece of foamed base material (1) having lateral portions (2), fixing said material to one part of the die, covering the surface of said material (1) with a layer of non-woven material (3), said layer of non-woven material covering only partially said lateral portions (2), injecting in the hollow portion of the die at least one foamable material (4) of properties different from the material of said first base material, and allowing said foamable material to penetrate said base material (1) and said lateral portions (2).

2. A process for the manufacture of a cushion for the seating part or the backrest of a seat of a motor vehicle or the like which consists of introducing within one part of a two-part die, said die having at least one hollow portion, a preformed piece of foamed base material (1), fixing said piece to one part of the die, covering the surface of said material (1) with a layer of non-woven material (3), superimposing a layer of a first foamable material on the sides of said piece of material (1), injecting a second foamable material (4) of properties different from said first foamable material, into the hollow portion of the die and allowing said second foamable material to penetrate said first foamable material and said base material.

3. A cushion for the seat or the back of motor vehicles prepared by the process according to claim 6, which comprises a base layer (1) prepared from a block of foamed material, two lateral portions (2) obtained from a block of foamed material, an external layer (4) obtained by foaming plastic material, said layer (4) having properties different from said layer (1), and different from said lateral portions (2), a later of non-woven material (3) separating said two layers (1) and (4), partial penetration having occurred from said layer (4) into said layer (1) and said lateral portions (2), said cushion having a structure and a resistance to compression different in the different portions thereof.

* * * * *